United States Patent [19]
Dubois et al.

[11] 3,783,606
[45] Jan. 8, 1974

[54] MECHANISM FOR COUPLING AND LOCKING A ROTATABLE MEMBER OF A TIMEPIECE AND OF A SMALL MECHANISM

[75] Inventors: Gérald Dubois; François Berthoud, both of Le Lieu, Switzerland

[73] Assignee: Ebauches S.A., Neuchatel, Switzerland

[22] Filed: Mar. 8, 1973

[21] Appl. No.: 339,300

[30] Foreign Application Priority Data
Mar. 15, 1972 Switzerland.......................... 761/72

[52] U.S. Cl.................................... 58/74, 58/59
[51] Int. Cl........................ G04f 7/04, G04b 33/00
[58] Field of Search..................... 58/74–78, 59, 138

[56] References Cited
UNITED STATES PATENTS
3,653,201  4/1972  Ogawa et al........................... 58/74

Primary Examiner—George H. Miller, Jr.
Attorney—I. Irving Silverman et al.

[57] ABSTRACT

Mechanism for coupling and locking a rotatable member of a timepiece. Rotatively connected driving and driven elements are coaxially mounted on a common shaft. One element bears axially against a shoulder of the shaft by the force of a spring bearing on another shoulder of the shaft. A control member acts on the spring to effect movement of the spring and two elements until the driven element abuts a locking stud causing release of the force against the elements and thereby releasing them one from another.

4 Claims, 1 Drawing Figure

PATENTED JAN 8 1974 3,783,606
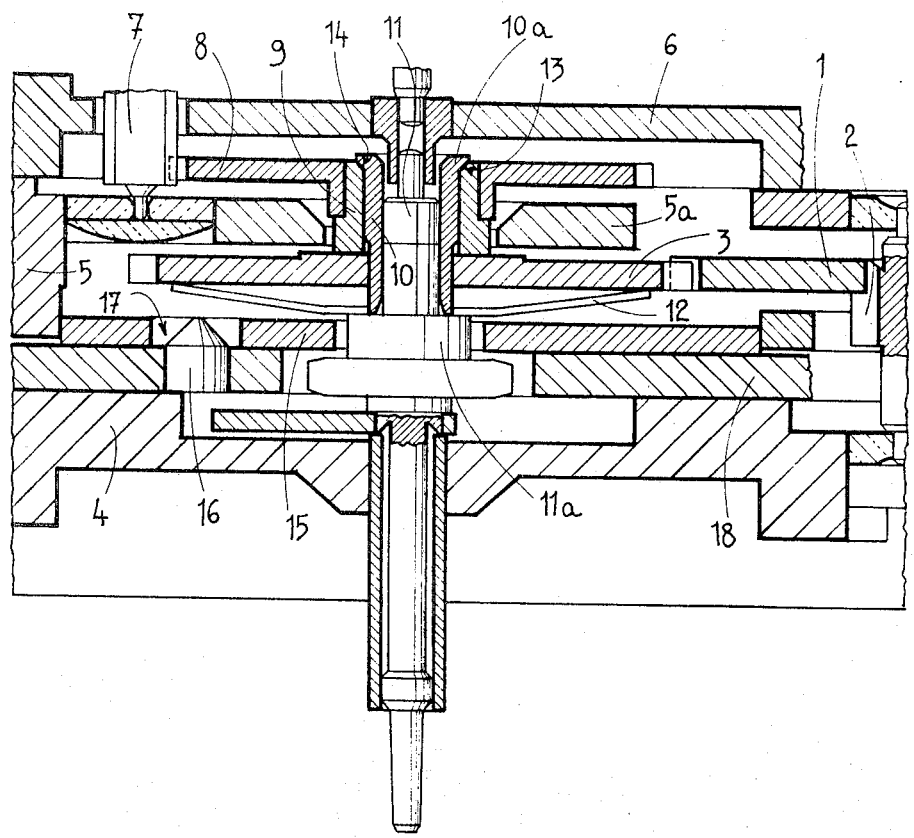

MECHANISM FOR COUPLING AND LOCKING A ROTATABLE MEMBER OF A TIMEPIECE AND OF A SMALL MECHANISM

The present invention has for object a mechanism for coupling and for locking a rotatable member of a timepiece and of a small mechanism.

This mechanism is characterized by the fact that it comprises two elements —driving and driven—, coaxial to each other, both loosely mounted on a common shaft, one of which is axially bearing against a shoulder of the said shaft against which it is pressed, by the intermediary of the other element, by a spring bearing on another shoulder of the said shaft, the axial force mutually applied by the said elements one on each other ensuring their rotative connection, a control member being arranged in such a way as to act on the spring for moving axially the complex constituted by the spring and the two elements, driving and driven, the whole in such a way that the operation of the said control member produces the displacement of the said complex until the driven element be applied against an element of the frame, that locks it, and that, simultaneously, ceases the force applying against one another the said two elements, that releases them one from another.

The drawing shows, by way of example, one embodiment of the object of the invention.

The FIGURE is a sectional view of a mechanism of coupling and of locking belonging to the gearing of a chronograph mechanism.

In the example as represented, the gearing of a chronograph mechanism, of which only one element 1–2 and a wheel 3 have been represented, is carried by a frame comprising two plates 4 and 5 and bridges as the bridge 6. The driving of this gearing is ensured by the pinion 7 of the third wheel of the watch movement by the intermediary of the coupling device which is hereafter disclosed.

This mechanism comprises a wheel 8 rigid with a hub 9, constituting the driving element, which is coaxial to the wheel 3, which constitutes the driven element. The wheels 3 and 8 are both loosely mounted on a cannon 10 forced on a shaft 11 carrying the hand, not represented, of the chronograph. The hub 9 is pressed against a shoulder 10a of the cannon 10 by a spring 12 interposed between the wheel 3 and a shoulder 11a of the shaft 11. The shoulder 10a is provided with a seat 13, which is frusto-conical, with which cooperates a bearing surface 14, of corresponding shape, provided at the extremity of the hub 9.

Owing to this arrangement, when the mechanism is in the coupled position, such as represented in the drawing, the wheel 3 is made rigid with the wheel 8 owing to the mutual axial force these two wheels exert one on the other under the effect of the spring 12 ; likely, this wheel 8 is made rigid with the cannon 10, and consequently with the shaft 11, owing to the mutual axial force exerted by the wheel 8 and by the cannon 10 one on the other, also under the effect of the spring 12. The shaft 11 thus constitutes a second driven element of the coupling mechanism.

This mechanism comprises a control member 15, constituted by a circular small plate located in a recess of corresponding shape of the plate 5, able to move axially under the pushing exerted thereon by three conical studs 16, arranged at 120° one from each other, only one of which is visible on the drawing, which pass through holes 17 provided in the small plate 15, and which are carried by a control sliding member 18 moving transversally. This sliding member belongs to the control mechanism of the chronograph and will not be disclosed in detail since it is out of the scope of the invention.

When the studs 16 acting on the edge of the holes 17 lift the small plate 15, this latter lifts also the spring 12 which lifts the wheel 3 and applies it axially against a bearing surface 5a of the plate 5, that locks it. At the same time, the axial force exerted by the spring 12 on the shoulder 11a of the shaft 11 ceases, that renders the wheel 8 free from the wheel 3 on the one hand and from the cannon 10 on the other hand. The coupling mechanism is thus combined with a locking mechanism which locks the wheel 3 as soon as this one is uncoupled.

What we claim is :

1. Mechanism of coupling and of locking of a rotative member of a timepiece and of a small mechanism, characterized by the fact that it comprises two elements —driving and driven—, coaxial to each other, both loosely mounted on a common shaft, one of which is axially bearing against a shoulder of the said shaft against which it is pressed, by the intermediary of the other element, by a spring bearing on another shoulder of the said shaft, the axial force mutually applied by the said elements one on each other ensuring their rotative connection, a control member being arranged in such a way as to act on the spring for moving axially the complex constituted by the spring and the two elements, driving and driven, the whole in such a way that the operation of the said control member produces the displacement of the said complex until the driven element be applied against an element of the frame, that locks it, and that, simultaneously, ceases the force applying against one another the said two elements, that releases them one from another.

2. Mechanism as claimed in claim 1, characterized by the fact that the arrangement is such that, when the coupling is uncoupled, the driving element be not only released from the driven element, but also released from the shaft with which, on the contrary, it is rigid when the coupling is coupled, and which thus constitutes a second driven element.

3. Mechanism as claimed in claim 1, characterized by the fact that the shoulder against which bears the driving element is frusto-conical, the driving element being provided with a corresponding surface cooperating with the said shoulder.

4. Mechanism as claimed in claim 1, characterized by the fact that it comprises a disc shaped member, coaxial to the driving and driven elements, axially movable, acting on the spring for moving it axially under the effect of a control element showing embossments axially directed and which act on the said member.

* * * * *